United States Patent
Nagaoka

[11] Patent Number: 6,128,145
[45] Date of Patent: Oct. 3, 2000

[54] IMAGE PICK-UP DEVICE, IMAGE DISPLAY DEVICE AND INFORMATION RECORDING MEDIUM COMPRISING A FISHEYE LENS

[75] Inventor: Tooru Nagaoka, Nagano-Pref, Japan

[73] Assignees: FIT Corporation, Nagano-Pref.; Rios Corporation; Advanet, Inc., both of Okayama-Pref., all of Japan

[21] Appl. No.: 09/300,972

[22] Filed: Apr. 28, 1999

[30] Foreign Application Priority Data

Nov. 25, 1998 [JP] Japan .................................. 10-350751

[51] Int. Cl.$^7$ .................................................. G02B 13/04

[52] U.S. Cl. .......................................... 359/749; 359/672

[58] Field of Search ........................... 359/749, 750–753, 359/680–682, 672–675

[56] References Cited

U.S. PATENT DOCUMENTS

| | | | |
|---|---|---|---|
| 4,400,063 | 8/1983 | Hayashida | 359/662 |
| 5,121,099 | 6/1992 | Hegg et al. | 340/461 |
| 5,502,592 | 3/1996 | Jamieson | 359/355 |

*Primary Examiner*—Georgia Epps
*Assistant Examiner*—Jordan M. Schwartz
*Attorney, Agent, or Firm*—McAulay Nissen Goldberg & Kiel, LLP

[57] ABSTRACT

An image is picked up by a camera comprising a fisheye lens having a relationship of $h = n \cdot f \cdot \tan(\theta/m)$, wherein h is the height of an image of a subject at a certain point, f is the focal distance of the fisheye lens, $\theta$ is a field angle, m has a value of $1.6 \leq m \leq 3$, and n has a value of $m - 0.4 \leq n \leq m + 0.4$, and the image data of which is output from the camera, is converted into a plane image by an image data processing unit, and this converted image is then output to a monitor unit. Preferably, n and m both equal 2.

14 Claims, 9 Drawing Sheets

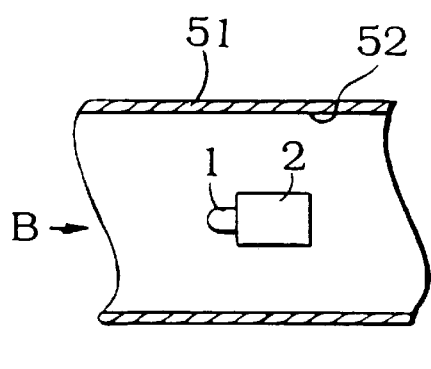
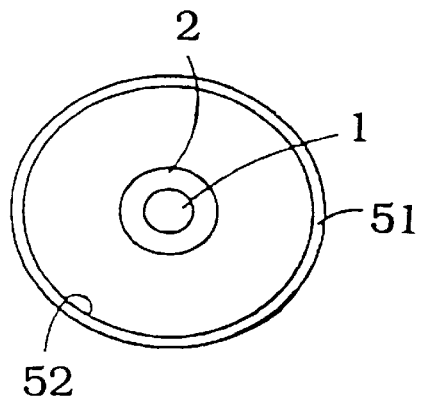
FIG.8A
FIG.8B
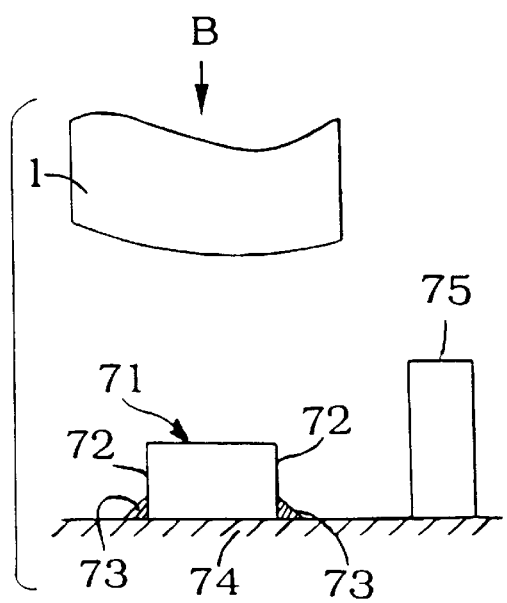
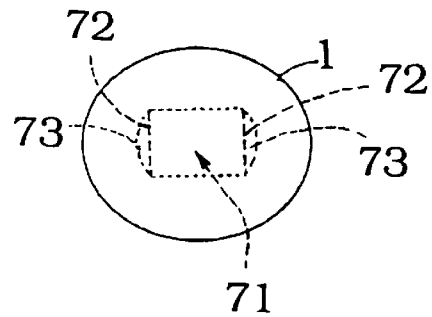
FIG.9A
FIG.9B

IMAGE PICK-UP DEVICE, IMAGE DISPLAY DEVICE AND INFORMATION RECORDING MEDIUM COMPRISING A FISHEYE LENS

BACKGROUND OF THE INVENTION

The present invention relates to an image pick-up device comprising a fisheye lens, an image display device and an information recording medium, all of which can obtain a high-quality converted image when an image picked up by the fisheye lens is converted into a plane image.

A monitoring system using a camera which enables product examination at a plant or construction work at a construction site to be monitored from a remote place has recently been developed. In this monitoring system, depending on what is monitored, capability of monitoring a wide range at a limited number of cameras is desired. To realize this, the development of a monitoring system comprising a fisheye lens which can pick up an image of all the directions of the field of view around the optical axis at a field angle of at least 90° in each direction with respect to the optical axis is under way.

Use of this fisheye lens makes it possible to obtain an image of all the space with a single camera. That is, the space is regarded as a single sphere, a camera is installed at the center of the sphere, an image of half of the sphere is picked up by the fisheye lens, the camera is turned at an angle of 180° from that position, an image of the other half of the sphere in the opposite direction is picked up, and the two images are combined together to obtain an image of all the directions of the field of view in the space of 360°, that is, the sphere. This image is converted into a plane image.

As the monitoring system comprising a fisheye lens of the prior art, there is a system disclosed by Japanese Patent Application Laid-open No. Hei6-501585 (to be referred to as "prior art" hereinafter), for example. Although this prior art makes it possible to pick up an image of all the directions of the field of view, the lens used in the prior art is a fisheye lens having a relationship of $h=f \cdot \theta$ (wherein h is the height of an image of a subject at a certain point obtained by the fisheye lens, f is the focal distance of the fisheye lens and $\theta$ is a field angle). This is obvious from the fact that Nikon's 8-mm f/2.8 lens is used as the fisheye lens in the above Japanese Patent Application Laid-open No. Hei6-501585. Conventional fisheye lenses generally have a relationship of $h=f \cdot \theta$ and Nikon's 8-mm f/2.8 fisheye lens has the above relationship of $h=f \cdot \theta$.

The method of picking up an image by a fisheye lens having this relationship of $h=f \cdot \theta$ and converting the image into a plane image is called "equidistant projection". Since an image picked up by a fisheye lens having the above characteristics has a small volume of image data on its peripheral portion (field angle of around 90° with respect to the optical axis of the fisheye lens), when the image is converted into a plane image, there are many missing portions of image data on the peripheral portion of the image and the missing portions must be interpolated. In addition, the image picked up by the fisheye lens having the above characteristics involves such a problem that the peripheral portion of the image is distorted.

An object of the present invention is to provide an image pick-up device comprising a fisheye lens, an image display device and an information recording medium, which minimize missing portions of image data by extracting a large volume of image data at a field angle of around 90° with respect to the optical axis of the fisheye lens to reduce interpolating of the missing portions and can obtain a natural plane image when images of all the directions of the field of view around the optical axis are picked up at a field angle of at least 90° with respect to the optical axis and are converted into plane images.

Various other objects, advantages and features of the present invention will become readily apparent to those of ordinary skill in the art, and the novel features will be particularly pointed out in the appended claims.

SUMMARY OF THE INVENTION

To attain the above object, according to a first aspect of the present invention, there is provided an image pick-up device comprising a fisheye lens for picking up an image of all the directions of the field of view around the optical axis of the fisheye lens at a field angle of at least 90° in each direction with respect to the optical axis, wherein the fisheye lens has a relationship of $h=nf \cdot \tan(\theta/m)$ (wherein h is the height of an image of a subject at a certain point obtained by the fisheye lens, f is the focal distance of the fisheye lens, $1.6 \leq m \leq 3$, $m-0.4 \leq n \leq m+0.4$, and $\theta$ is a field angle).

According to a second aspect of the present invention, the fisheye lens is constructed by a master lens provided on an existing image pick-up device and by an attachment lens to be attached to the master lens.

Further, according to a third aspect of the present invention, there is provided an image display device comprising an image data processing unit for converting an image obtained by the image pick-up device of the first or second aspect of the present invention into a plane image and a display unit for displaying the converted plane image.

According to a fourth aspect of the present invention, there is provided an information recording medium that records a program having at least the step of converting an image obtained by a fisheye lens having a relationship of $h=nf \cdot \tan(\theta/m)$ (wherein h is the height of an image of a subject at a certain point, f is the focal distance of the fisheye lens, $\theta$ is a field angle, $1.6 \leq m<3$, and $m-0.4 \leq n \leq m+0.4$) into a plane image, the step of displaying a predetermined portion of the converted plane image on a display unit and the step of changing continuously the predetermined portion with instruction means.

One of the fisheye lens used in the present invention has the relationship of $h=2f \cdot \tan(\theta/2)$. Compared with an ordinary fisheye lens having a relationship of $h=f \cdot \theta$, an image at a peripheral portion (field angle of around 90° with respect to the optical axis of the fisheye lens) is enlarged and missing portions of image data on the peripheral portion can be minimized with the fisheye lens in accordance with the present invention. With this, when a picked-up image is to be converted into a plane image, the interpolating of image data can be reduced, thereby making it possible to obtain a more natural plane image.

The fisheye lens according to the present invention may be constructed by attaching an attachment lens to a master lens provided on an existing camera so that the fisheye lens can be attached to almost all the existing cameras. In addition, only the attachment lens is newly produced, thereby making it possible to reduce costs.

Further, the image display device for displaying a plane image converted from an image picked up by the image pick-up device having the above fisheye lens on a display unit makes the displayed image easy to be seen, thereby improving the value of the device. When the information recording medium recording the above steps is read by a computer and the program is executed, a more natural plane image can be displayed on the display unit and the displayed portion can be freely shifted within the range of the image picked up by the image pick-up device.

BRIEF DESCRIPTION OF THE DRAWINGS

The following detailed description, given by way of example and not intended to limit the present invention solely thereto, will best be appreciated in conjunction with the accompanying drawings, wherein like reference numerals denote like elements and parts, in which:

FIGS. 8(A) and 8(B) are diagrams showing another application example of the image pick-up device of the present invention, wherein FIG. 8(A) is a schematic diagram showing the side thereof and FIG. 8(B) is a diagram when seen from a direction indicated by an arrow B in FIG. 8(A);

FIGS. 9(A) and 9(B) are diagrams showing still another application example of the image pick-up device of the present invention, wherein FIG. 9(A) is a schematic diagram showing the side thereof and FIG. 9(B) is a diagram when seen from a direction indicated by an arrow B in FIG. 9(A)

DETAILED DESCRIPTION OF CERTAIN PREFERRED EMBODIMENTS

Preferred embodiments of the present invention will be described hereinafter with reference to FIGS. 1 to 10.

Figure 1:
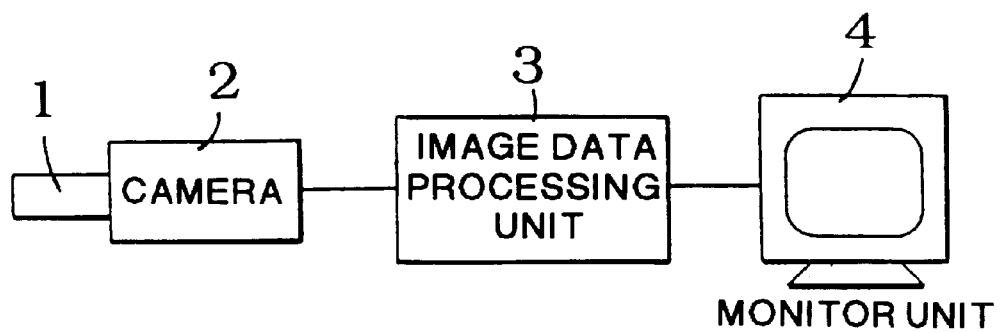
FIG. 1 is a schematic structural diagram of an image processing system using an image pick-up device comprising a fisheye lens according to the present invention.

FIG. 1 schematically shows an image processing system utilizing an image pick-up device comprising a fisheye lens of the present invention. This image processing system comprises a camera (such as a video camera) 2 that is an image pick-up device equipped with a fisheye lens 1, an image data processing unit 3 for processing image data from the camera 2, and a monitor unit 4 for displaying an image processed by the image data processing unit 3. The image data processing unit 3 has a CPU, memory means and the like and performs various processing using image data output from the camera 2. In the case of the present invention, the image data processing unit 3 also converts an image picked up by the fisheye lens 1 into a plane image.

Figure 2:
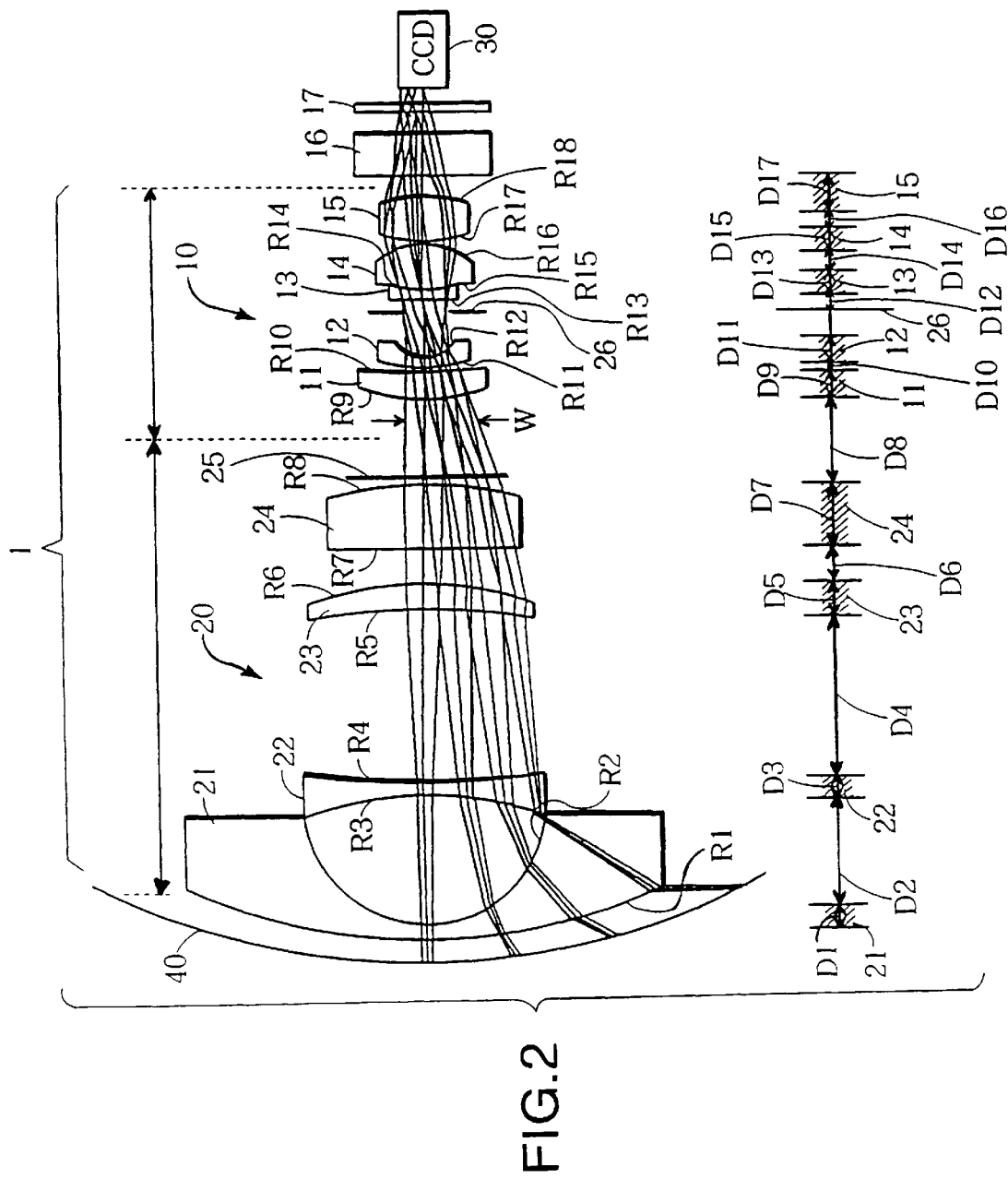
FIG. 2 are a structural diagram of the fisheye lens shown in FIG. 1 and a corresponding diagram schematically showing lens intervals (lens intervals and lens thicknesses)

As shown in FIG. 2, the fisheye lens 1 used in this embodiment roughly consists of a lens unit (called master lens unit) 10 provided on the camera 2 and a lens unit (called attachment lens unit) 20 that can be attached to and detached from the master lens unit 10. The fisheye lens 1 of the present invention functions as a fisheye lens when the attachment lens unit 20 is attached to the master lens unit 10.

The attachment lens unit 20 consists of a first lens 21, a second lens 22, a third lens 23, a fourth lens 24 and a plate 25. The master lens unit 10 consists of a fifth lens 11, a sixth lens 12, a seventh lens 13, an eighth lens 14, a ninth lens 15 and a diaphragm 26 interposed between the sixth lens 12 and the seventh lens 13.

The curvature R (diameter of the curved surface of the lens) of each lens and interval D (lens thickness or lens interval) in this embodiment are as follows. That is, beginning with the curvature R1 of the left curved surface of the first lens 21 on the leftmost side of FIG. 2, in turn, the curvatures R1 and R2 of the first lens 21 are 40.0 mm and 9.0 mm, the curvatures R3 and R4 of the second lens 22 are −26.0 mm and 80.0 mm, the curvatures R5 and R6 of the third lens 23 are −36.0 mm and −20.0 mm, and the curvatures R7 and R8 of the fourth lens 24 are −81.0 mm and −27.0 mm, respectively.

Further, the curvatures R9 and R10 of the fifth lens 11 are 14.0 mm and 68.0 mm, the curvatures R11 and R12 of the sixth lens 12 are 9.0 mm and 3.0 mm, the curvatures R13 and R14 of the seventh lens 13 are 0.0 mm and −8.0 mm, the curvatures R15 and R16 of the eighth lens 14 are 10.0 mm and −6.0 mm, and the curvatures R17 and R18 of the ninth lens 15 are 11.0 mm and −9.0 mm, respectively.

Meanwhile, the thickness D1 of the first lens 21 on the leftmost side of FIG. 2 is 1.2 mm, the interval D2 between the first lens 21 and the second lens 22 is 10.00 mm, and the thickness D3 of the second lens 22 is 1.2 mm. The interval D4 between the second lens 22 and the third lens 23 is 14.0 mm, the thickness D5 of the third lens 23 is 2.0 mm, the interval D6 between the third lens 23 and the fourth lens 24 is 3.0 mm, and the thickness D7 of the fourth lens 24 is 5.0 mm.

Further, the interval D8 between the fourth lens 24 and the fifth lens 11 is 7.0 mm, the thickness D9 of the fifth lens 11 is 2.0 mm, the interval D10 between the fifth lens 11 and the sixth lens 12 is 0.3 mm, and the thickness D11 of the sixth lens 12 is 0.8 mm The seventh lens 13, the eighth lens 14 and the ninth lens 15 can be moved in the direction of the optical axis to change magnification, and the intervals between adjacent lenses to be described hereinafter are maximum values thereof. The interval D12 between the diaphragm 26 and the seventh lens 13 is 4.0 mm, the thickness D13 of the seventh lens 13 is 1.0 mm, the interval D14 of the seventh lens 13 and the eighth lens 14 is 1.0 mm, and the thickness D15 of the eighth lens 14 is 4.0 mm.

The interval D16 between the eighth lens 14 and the ninth lens 15 is 2.0 mm, and the thickness D17 of the ninth lens is 4.0 mm. Parallel plates 16 and 17 are arranged on the right side in FIG. 2 of the ninth lens 15.

In this arrangement, light incident upon the first lens 21 passes through the first to fourth lenses 21 to 24, further through the fifth to ninth lenses 11 to 15 and is input into CCD image pick-up elements 30 in the camera 2. In this attachment lens unit 20, parallel rays input into the first lens 21 are output from the fourth lens 24 as parallel rays. Therefore, this attachment lens unit 20 can be attached to almost all the cameras. The width of the parallel pencil of rays output from the fourth lens 24 of the attachment lens unit 20 (shown by "w" in the figure) is set to ½ or less the effective diameter of the master lens 10 of the camera to which the attachment lens unit 20 is attached. In FIG. 2, the spherical surface 40 at the front of the first lens 21 represents a virtual subject surface of the picked up image.

As described above, the present invention is characterized in that a desired fisheye lens 1 constructed by the master lens unit 10 and the attachment lens unit 20 and has a relationship of $h=2f \cdot \tan(\theta/2)$ (wherein h is the height of an image of a subject at a certain position, f is the focal distance of the fisheye lens and $\theta$ is a field angle). It is noted that although the preferred embodiment of the present invention has the above-indicated relationship, the present invention also embodies fisheye lenses having the relationship of $h=n \cdot f \cdot \tan(\theta/m)$, where m has the value of $1.6 \leq m \leq 3$, and n has the value of $m-0.4 \leq n \leq m+0.4$. Also, the present invention contemplates such a relationship when m equals n. Also, the relationship $h=1.2 \ f \cdot \tan(\theta/m)$, $m \geq 1.6$ also is embodied by the present invention. However, for purposes of discussion herein, m and n both equal to 2.

The fisheye lens that has been generally used in the prior art has a relationship of $h=f \cdot \theta$ as described above. These functions are used to map a spherical image as a polar-coordinate converted image. The relationship, other than that, may be $h=2f \cdot \sin(\theta/2)$, $h=2f=\cdot \sin \theta$ or $h=f \cdot \tan \theta$.

Figure 3A:
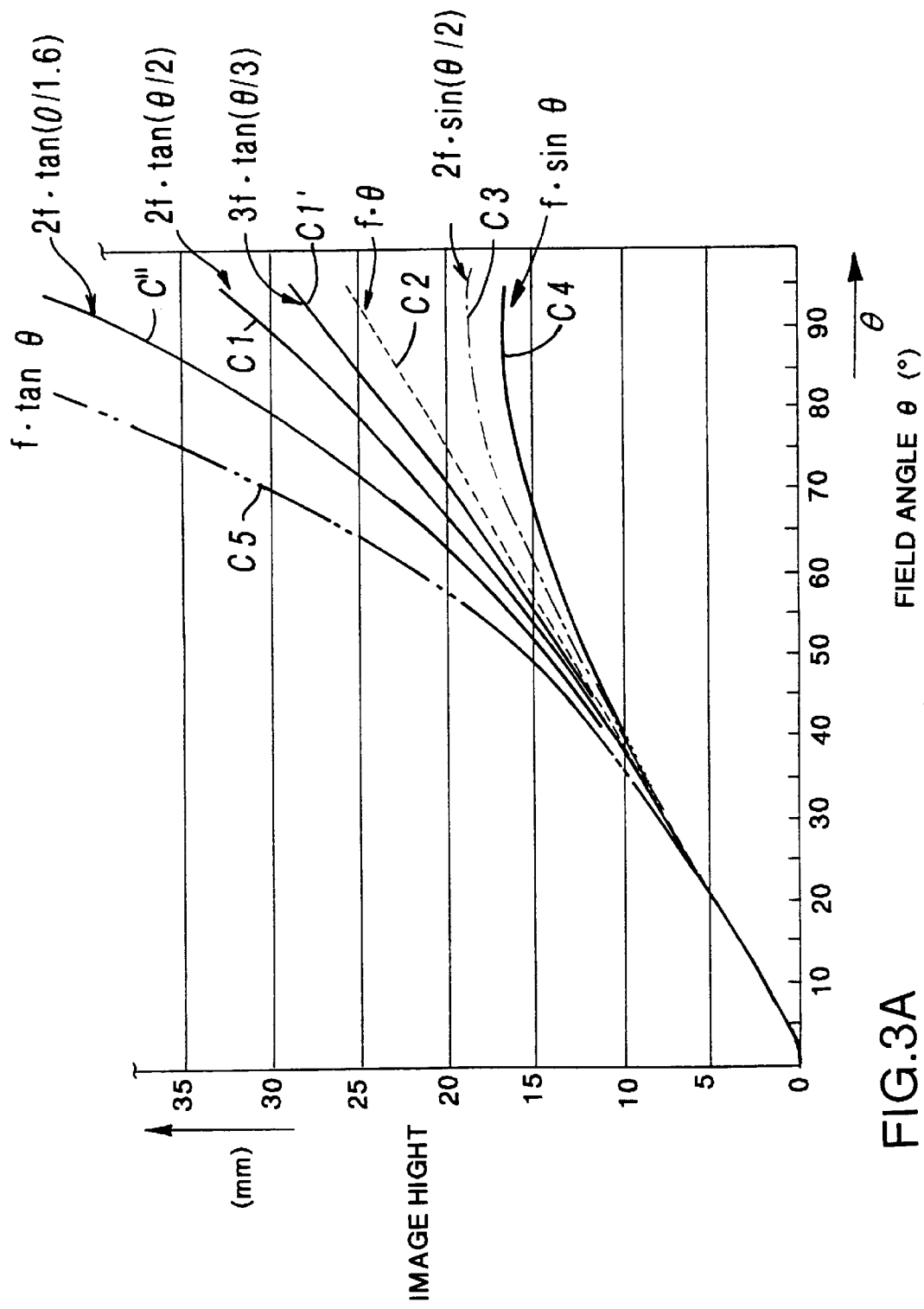
FIG. 3(A) is a diagram showing the relationship between field angle $\theta$ and image height h with respect to fisheye lenses having relationships of $h=f\cdot\theta$, $h=2f\cdot\sin(\theta/2)$, $h=f\cdot\sin\theta$, $h=f\cdot\tan\theta$, $h=3f\cdot\tan(\theta/3)$, $h=2f\cdot(\tan\theta/1.6)$ and one of the fisheye lenses of the present invention having a relationship of $h=2f\cdot\tan(\theta/2)$.

FIG. 3(A) is a diagram showing relationships between field angle $\theta$ and image height h when fisheye lenses having relationships of $h=2f \cdot \tan(\theta/2)$, $h=f \cdot \theta$, $h=f \cdot \sin(\theta/2)$, $h=f \cdot \sin \theta$ and $h=f \cdot \tan \theta$, etc. are used. Here, $\theta=90°$ shows a field angle with respect to the optical axis (the field angle of the optical axis is 0°).

In FIG. 3(A), a curve C1 shows the relationship between field angle $\theta$ and image height h when the fisheye lens of the present invention having the relationship of $h=2f \cdot \tan(\theta/2)$ is used, and a curve C2 shows the relationship between field angle $\theta$ and image height h when a fisheye lens having the relationship of $h=f \cdot \theta$ is used. A curve C3 shows the relationship between field angle $\theta$ and image height h when a fisheye lens having the relationship of $h=2f \cdot \sin(\theta/2)$ is used, a curve C4 shows the relationship between field angle $\theta$ and image height h when a fisheye lens having the relationship of $h=2f \cdot \sin \theta$ is used, and a curve C5 shows the relationship between field angle $\theta$ and image height h when a fisheye lens having the relationship of $h=f \cdot \tan \theta$ is used. A curve C1' shows the relationship of $h=3f \cdot \tan(\theta/3)$ and a curve C" shows the relationship of $h=2f \cdot \tan(\theta/1.6)$.

Figure 3B:
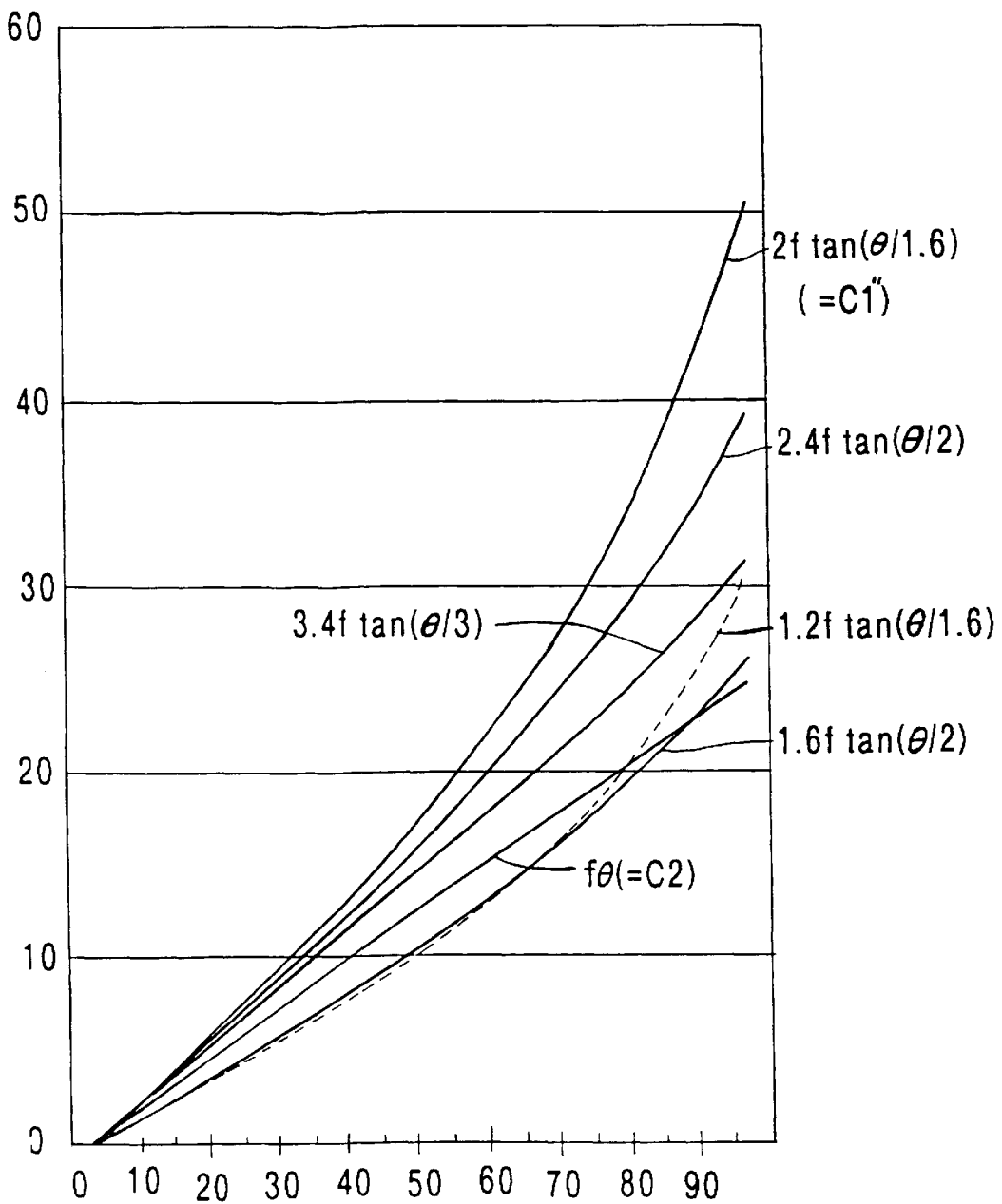
FIG. 3(B) is a diagram showing the relationship between field angle $\theta$ and image height h with respect to fisheye lenses having relationships of $h=2f\cdot\tan(\theta/1.6)$, $h=2.4f\cdot\tan(\theta/2)$, $h=3.4f\cdot\tan(\theta/3)$, $h=1.2f\cdot\tan(\theta/1.6)$, $h=1.6f\cdot\tan(\theta/2)$ and $h=f\cdot\theta$.

FIG. 3(B), is a diagram showing the relationship between field angle $\theta$ and image height when fisheye lenses having relationships of $h=2f \cdot \tan(\theta/1.6)$, $h=2.4f \cdot \tan(\theta/2)$, $h=3.4f \cdot \tan(\theta/3)$, $h=1.2f \cdot \tan(\theta/1.6)$, $h=1.6f \cdot \tan(\theta/2)$ and $h=f \cdot \theta$. All of these fisheye lenses, except $h=f \cdot \theta$, are embodied by the present invention.

As is evident from FIG. 3, an increase in image height h at a field angle $\theta$ of about 90° is largest when the fisheye lens having the relationship of $h=f \cdot \tan \theta$ is used and is second largest when the fisheye lens having the relationship of $h=2f \cdot \tan(\theta/2)$ is used. Changes in image height h with respect to changes in field angle $\theta$ become linear when the fisheye lens having the relationship of $h=f \cdot \theta$ is used and further an increase in image height h tends to be smaller as the field angle becomes closer to 90° when the fisheye lenses having the relationships of $h=2f \cdot \sin(\theta/2)$ and $h=f \cdot \sin \theta$ are used.

An increase in image height becomes larger toward the peripheral portion (field angle of 90°) when the fisheye lens having the relationship of $h=f \cdot \tan \theta$ is used and more image data can be obtained. However, at a field angle $\theta$ of 90°, $\tan \theta$ becomes infinite. Since the fisheye lens is required to obtain an image of all the directions of the field of view around the optical axis at a field angle of at least 90° with respect to the optical axis, it can be said that the fisheye lens having the relationship of $h=f \cdot \tan \theta$ is not suitable.

Figure 4A:
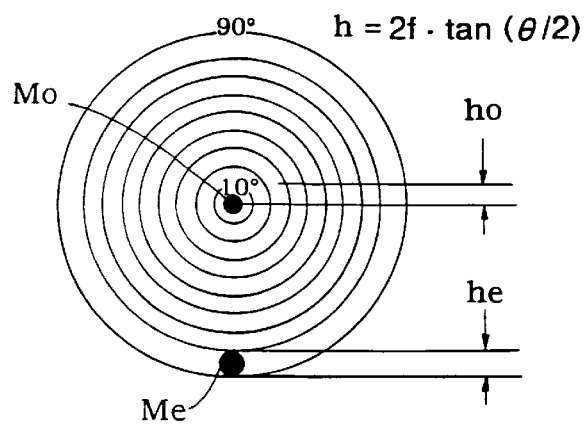
FIGS. 4(A) to 4(D) are views illustrating, in concentric circles each centering around the optical axis of each fisheye lens shown in FIG. 3, changes of image heights when the field angle is changed in 10° with respect to the optical axis of each fisheye lens.
Figure 4B:
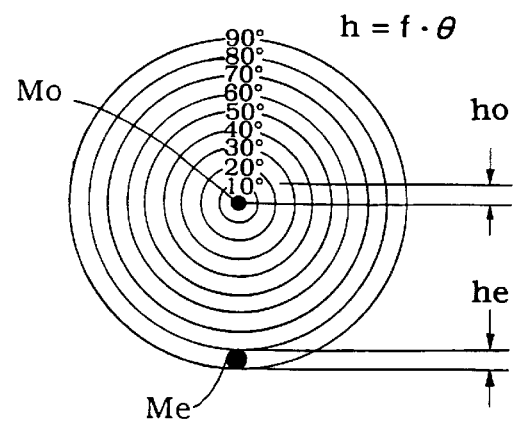
Figure 4C:
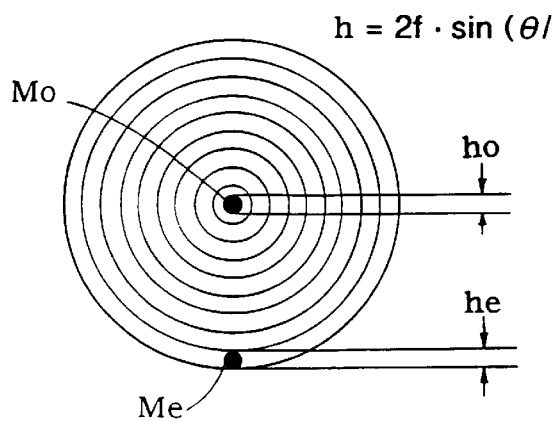
Figure 4D:
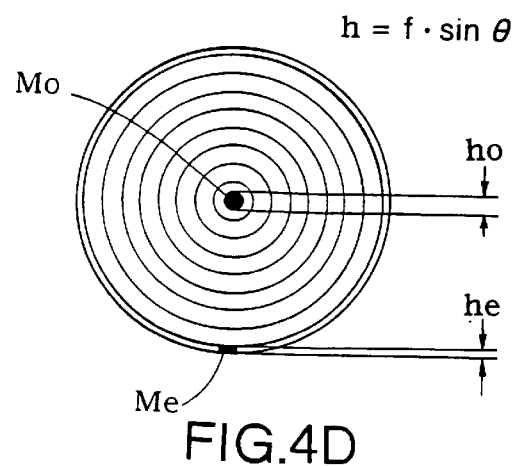

Therefore, the fisheye lenses having relationships of $h=2f \cdot \tan(\theta/2)$, $h=f \cdot \theta$, $h=2f \cdot \sin(\theta/2)$ and $h=f \cdot \sin \theta$ may be used. FIGS. 4(A) to 4(D) show, in concentric circles each centering around the optical axis of each fisheye lens, image heights h when the field angle $\theta$ is changed in 10° with respect to the optical axis of each fisheye lens. FIG. 4(A) shows the image height in the fisheye lens having the relationship of $h=2f \cdot \tan(\theta/2)$, FIG. 4(B) shows the image height in the fisheye lens having the relationship of $h=f \cdot \theta$, FIG. 4(C) shows the image height in the fisheye lens having the relationship of $h=2f \cdot \sin(\theta/2)$, and FIG. 4(D) shows the image height in the fisheye lens having the relationship of $h=f \cdot \sin \theta$. In FIGS. 4(A) to 4(D), ho represents the height of an image Mo near the optical axis of each fisheye lens and he represents the height of an image Me at a field angle of around 90°.

As is understood from FIGS. 4(A) to 4(D), image height at a field angle of around 90° when the fisheye lens having the relationship of $h=2f \cdot \sin(\theta/2)$ or the fisheye lens having the relationship of $h=f \cdot \sin \theta$ is used is smaller than image height near the optical axis and only a small volume of image data can be obtained. The image height he of an image Me at a peripheral portion of the fisheye lens that has been generally used and has the relationship of $h=f \cdot \theta$ is the same as the image height ho of an image Mo near the optical axis and the image is distorted.

From these facts, it can be said that the fisheye lenses having relationships of $h=2f \cdot \sin(\theta/2)$ and $h=f \cdot \sin \theta$ are not preferred in view that how large volume of data can be obtained at a field angle of 90° or therearound. Even with the fisheye lens that has been generally used and has the relationship of $h=f \cdot \theta$ is not satisfactory.

In contrast to that, the image height he of the image Me at a peripheral portion of the fisheye lens 1 having the relationship of $h=2f \cdot \tan(\theta/2)$ in accordance with the present invention is enlarged and larger than the image height ho of the image Mo near the optical axis, a larger volume of image data can be obtained in comparison with the conventional fisheye lens, and the obtained image is not distorted.

When a single spherical image obtained by combining two hemispherical images of all the directions of the field of view around the optical axis of the fisheye lens 1, which are picked up at a field angle of 90° with respect to the optical axis is converted into a plane image by the image data processing unit 3, it is necessary to interpolate missing image data on the peripheral portion (field angle of around 90° with respect to the optical axis) of the image. According to the present invention, since an image at the peripheral portion is enlarged and a large volume of data on the peripheral portion can be extracted, the volume of image data to be interpolated can be greatly reduced, when compared with the conventional system.

An image of all the directions of the field of view around the optical axis is picked up at a field angle of at least 90° with respect to the optical axis and is polar-coordinate converted into a plane image in the following manner.

Figure 5:
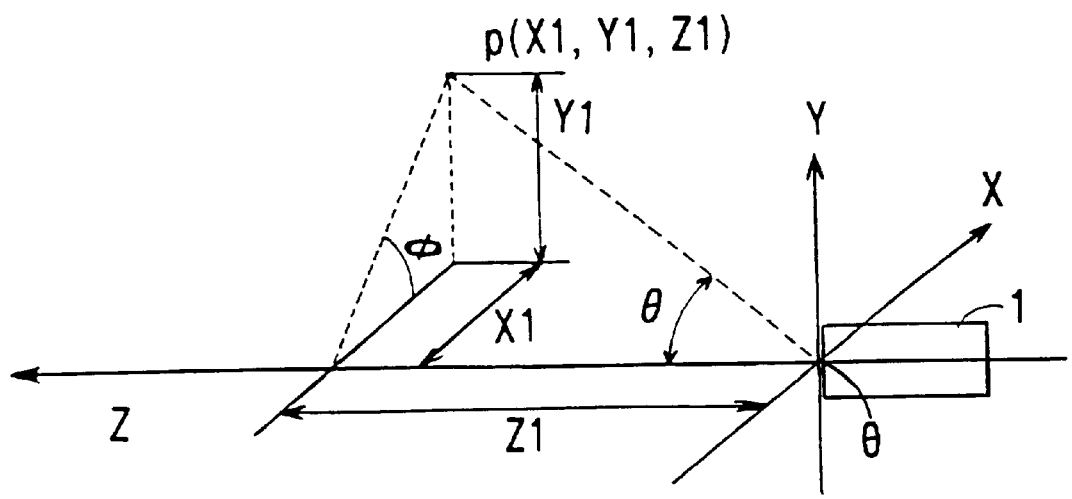
FIG. 5 is a diagram for explaining a method of polar-coordinate converting a hemispherical image obtained by a fisheye lens.

An X, Y and Z coordinate system as shown in FIG. 5 is imagined in subject space. At this point, the optical axis of the fisheye lens 1 is made Z axis. The coordinates of a certain point p are represented as (X1, Y1, Z1) and the elevation angle of the point p from the origin O of the coordinates with respect to the XZ plane is represented by θ. The elevation angle of the point p from the position of Z1 on the Z axis with respect to the XZ plane is represented by ø.

Figure 6:
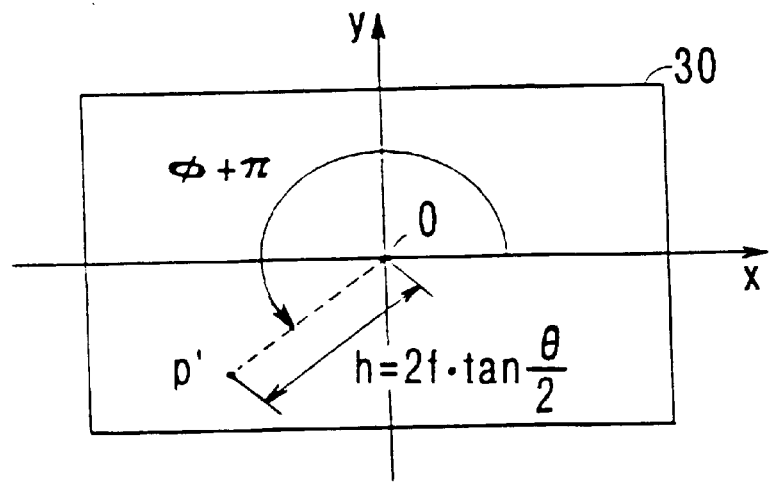
FIG. 6 is a diagram for explaining a method of obtaining the position of an image formation point on the surface of CCD image pick-up elements in the polar coordinate conversion of FIG. 5.

When an x and y coordinate system having the optical axis (Z axis) as an origin o is imagined on the surface of CCD image pick-up elements 30 as shown in FIG. 6 and the focal distance of the fisheye lens 1 is represented by f, the image formation point (p') for the point p is located as shown in FIG. 6. In FIG. 6, π is added to ø because an image formed at the point p' is inverted vertically and horizontally with respect to the image of the subject surface (point p). The optical axis in FIG. 6 is present in a direction perpendicular to the paper from the origin o of the x and y coordinates.

The position of the point p' is expressed as polar coordinates with a length (h) between the origin o and the point p' and an angle ø+π formed by op' and the x axis. When the polar coordinates are expressed on the x and y rectangular coordinates, the position (x1, y1) on the x and y rectangular coordinates are expressed as follows.

$$x1 = h \cdot \cos(ø+π) \quad (1)$$

$$y1 = h \cdot \sin(ø+π) \quad (2)$$

In addition, the image height h of the point p' is represented by $h = 2f \cdot \tan(θ/2)$, hence, when $h = 2f \cdot \tan(θ/2)$ is substituted into the above expressions (1) and (2), the coordinates (x1, y1) of the image formation point p' on the surface of the CCD image pick-up elements 30 are as follows.

$$x1 = 2f \cdot \tan(θ/2) \cdot \cos(ø+π) \quad (3)$$

$$y = 2f \cdot \tan(θ/2) \cdot \sin(ø+π) \quad (4)$$

As a result, they are expressed as follows.

$$x = -2f \cdot \tan(θ/2) \cdot \cos ø \quad (5)$$

$$y = -2f \cdot \tan(θ/2) \cdot \sin ø \quad (6)$$

In the above expressions, θ and ø are defined as follows.

$$θ = \tan^{-1}(\sqrt{X1^2+Y1^2}/Z1)$$

$$ø = \tan^{-1}(Y1/X1)$$

Thus, the position of the point p' on the surface of CCD image pick-up elements 30 can be obtained for the point p on the surface of the subject.

Thereafter, a description is subsequently given, with reference to FIG. 7, of steps required when the sphere (all directions) is photographed by the camera 2 comprising the fisheye lens 1 and an image thereof is displayed on the monitor unit 4 that is the display unit.

First, a hemisphere in one direction is photographed by the camera 2 comprising the fisheye lens 1 (step S1). Thereby, an image of the hemisphere is formed on the surface of the CCD image pick-up elements 30 as a polar-coordinate converted image. Thereafter, the camera 2 is turned at an angle of 180° to photograph the other hemisphere in the opposite direction (step S2). Thereby, an image of the other hemisphere is formed on the surface of the CCD image pick-up elements 30 as a polar-coordinate converted image.

The above two images are then combined together and the combined image is converted into a plane image by the image data processing unit 3 (step S3). At this point, an area corresponding to a connection portion between these hemispheres must be corrected. Since the polar-coordinate converted image obtained by the fisheye lens 1 has a large volume of information on a peripheral portion, the processing of combining these images is easy. Thereafter, a predetermined portion of the thus obtained plane image is extracted and displayed on the monitor unit 4 (step S4).

A user shifts the screen with instruction means such as a mouse when the user likes to change the displayed predetermined portion. This shifting can be made continuously in any direction of 360° around the portion displayed on the monitor unit 4 (step S5).

The above steps are for picking up an image of a sphere in all the directions of 360°. When only a single hemisphere is photographed, the same steps are taken. However, step S2 is unnecessary and the processing of combining two images in step S3 is also unnecessary.

In the present invention, since the volume of information on the peripheral portion of an image obtained by the fisheye lens 1 is large, that is, an image at the peripheral portion is enlarged, it is convenient when the present invention is used for the examination of a product. For example, when the inner surface 52 of a cylindrical body 51 is photographed at the condition that the optical axis of the fisheye lens 1 of the present invention is aligned with the central axis of the cylindrical body 51 as shown in FIGS. 8(A) and 8(B), a peripheral portion of an image can be extracted as an image having a larger volume of information than a central portion in the present invention. Therefore, it is easy to find that a scratch has been generated in the inner surface 52. Consequently, this can be used for the examination of a pipe-like body such as a water pipe or gas pipe and further for the monitoring of a crack that has been generated in the wall surface of a tunnel or the like.

It can also be used for the examination of the connection condition of a small part such as an IC. That is, when a part 71 is fixed to a substrate 74 by a solder 73 on its both sides 72 and 72 shown in FIGS. 9(A) and 9(B), the soldering state of the part must be checked from its side direction in the prior art. However, when another part 75 is existent in a side direction, the solder 73 on the part 75 side cannot be seen through a camera, thereby making automatic examination difficult. On the other hand, even when the fisheye lens 1 is installed right over the part 71 as shown in FIG. 9(A), the side direction of the part 71 can be sufficiently photographed by the camera 2 comprising the fisheye lens 1 of the present invention, thereby enabling automatic examination with the camera 2.

Although each foregoing embodiment is an example of a preferred embodiment of the invention, it is to be understood that the invention is not limited thereto and that various changes and modifications may be made in the invention without departing from the spirit and scope thereof. For example, the fisheye lens may be constructed by the attachment lens unit 20 alone without the master lens 10, or contrariwise may be constructed by an integrated unit of the master lens unit 10 and the attachment lens unit 20. Also, the construction and numerical values of the fisheye lens 1 shown in the above embodiment are just examples and a fisheye lens having other construction and numerical values may be used.

Figure 10:
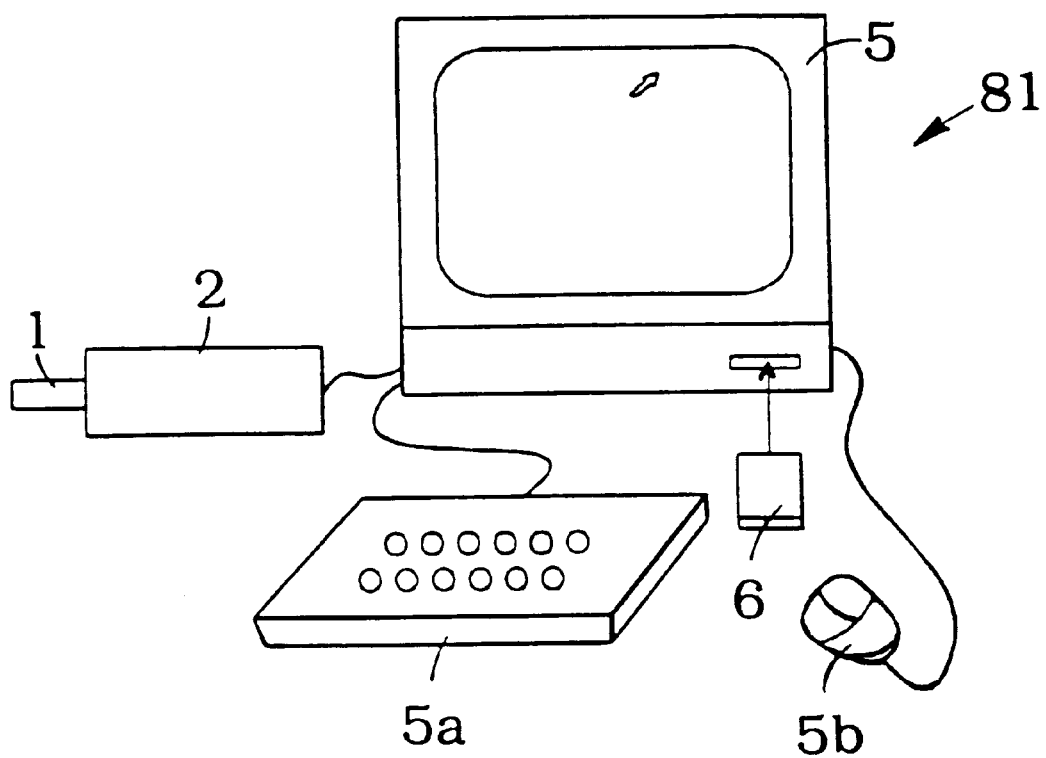
FIG. 10 is a diagram showing another example of an image processing system utilizing the image pick-up device comprising a fisheye lens of the present invention.

Further, as the system comprising the fisheye lens 1 of the present invention, an image processing system 81 shown in FIG. 10 may be used. This image processing system 81 is mainly constructed with a camera 2 equipped with a fisheye lens 1 and an image data processing unit/monitor 5 connected to the camera 2 by a cable. The image data processing unit/monitor 5 is a personal computer equipped with a monitor, and a key board 5$a$ and a mouse 5$b$ are connected to the computer as instruction means.

Figure 7:
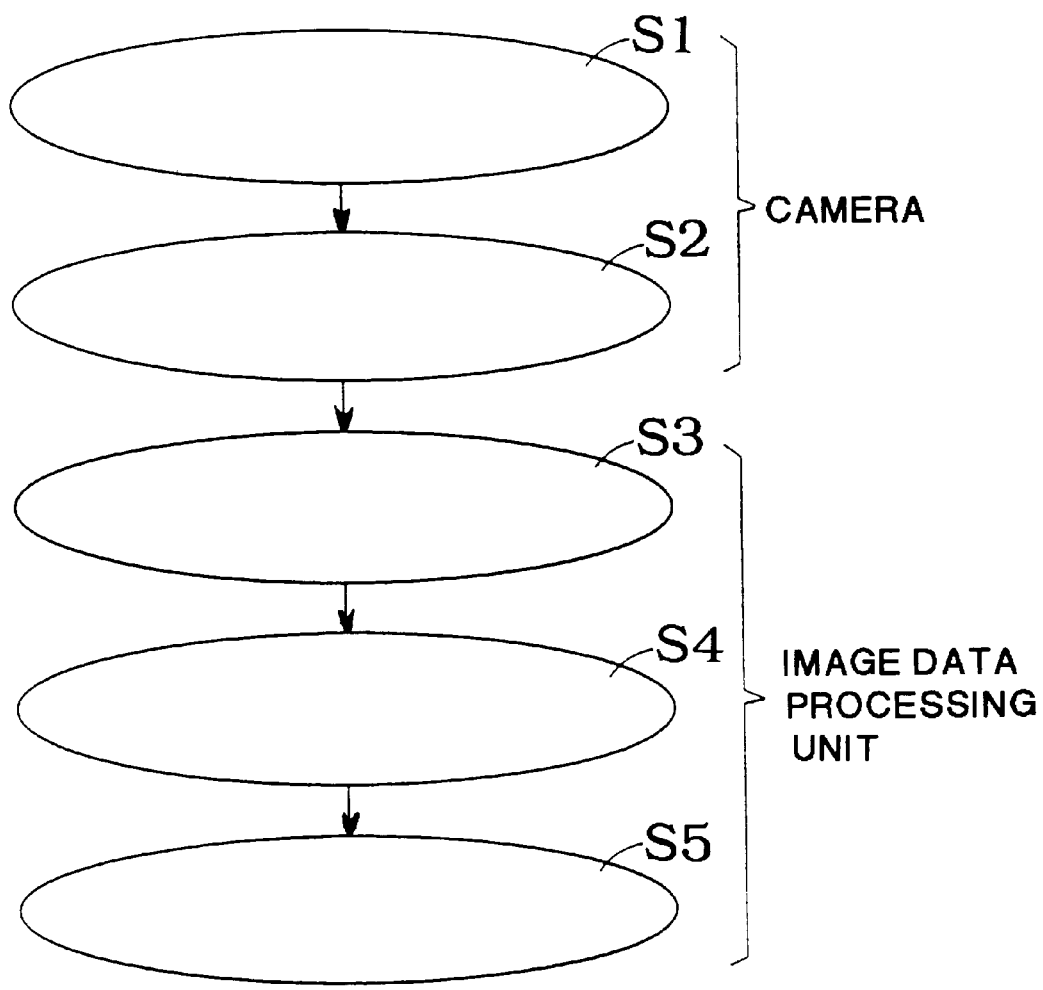
FIG. 7 is a flow chart for explaining the steps of processing an image using the image processing system of FIG. 1.

Also, this image data processing unit/monitor 5 has a hard disk (not shown) in that the contents of an information recording medium (floppy disk) 6 recording a program for executing the steps S3, S4 and S5 shown in FIG. 7 are to be installed. By installing this program in the image data processing unit/monitor 5, the image data processing unit/monitor 5 carries out the same function as the image data processing unit 3 which has been described in the foregoing.

Image pick-up data may be transferred from the camera 2 to the image data processing unit/monitor 5 by a memory card such as a flash card or wireless communication such as infrared communication, besides a cable. Further, the program may be installed not from the floppy disk 6 but other recording medium such as a CD-ROM, or transferred from other storage unit over a network. When the program is transferred over a network, the storage unit of a transmitter or the hard disk (storage unit) of the image data processing unit/monitor 5 serves as the information recording medium of the present invention.

As having been described above, in the image pick-up device comprising the fisheye lens according to the first aspect of the present invention, the fisheye lens has the relationship of $h=nf\cdot\tan(\theta/m)$ (wherein h is an image height, f is a focal distance, and $\theta$ is a field angle). With this, compared with the ordinary fisheye lens having the relationship of $h=f\cdot\theta$ (wherein h is an image height, f is a focal distance, and $\theta$ is a field angle), an image at a peripheral portion (field angle of around 90° with respect to the optical axis of the fisheye lens) is enlarged and the volume of information is large, thereby making it possible to minimize the missing portions of image data on the peripheral portion. When the picked-up image is to be converted into a plane image, interpolating of image data can be thereby minimized and a more natural plane image can be obtained.

Also, according to the second aspect of the present invention, by attaching the attachment lens different from the master lens provided on the existing image pick-up device (camera) to the master lens, the fisheye lens is constructed by this master lens and the attachment lens. Therefore, the fisheye lens can be attached to almost all the existing image pick-up devices (cameras) and further, only the attachment lens is newly produced, thereby reducing costs.

Further, according to the third aspect of the present invention, the image display device can convert a spherical image into a plane image with ease and can display a more natural plane image. In addition, according to the fourth aspect of the present invention, when the program recorded in the information recording medium is read and executed by a computer, a more natural plane image can be formed.

Therefore, it is intended that the appended claims be interpreted as including the embodiments described herein, the alternatives mentioned above, and all equivalents thereto.

What is claimed is:

1. An image pick-up device, comprising:

a fisheye lens for picking up an image of all directions of a field of view around an optical axis of said fisheye lens at a field angle of at least 90° in each direction with respect to the optical axis, the fisheye lens having a relationship of $h=n\cdot f\cdot\tan(\theta/m)$, h being a height of an image of a subject at a predetermined point obtained by the fisheye lens, f being a focal distance of the fisheye lens, $\theta$ being a field angle, m having a value of $1.6 \leq m < 3$, and n having a value of $m-0.4 < n \leq m+0.4$.

2. The image pick-up device of claim 1, wherein m and n are substantially equal.

3. The image pick-up device of claim 1, wherein m and n both substantially equal 2.

4. The image pick-up device of claim 1, wherein m and n both equal 2 such that the fisheye lens has a relationship of $h=2f\cdot\tan(\theta)/2)$.

5. The image pick-up device of claim 1, wherein the fisheye lens is constructed by a master lens provided on an existing image pick-up device and an attachment lens to be attached to the master lens.

6. An image display device, comprising:

an image data processing unit for converting an image obtained by the image pick-up device of claim 1 into a plane image; and a display unit for displaying the converted plane image.

7. The image display device of claim 6, wherein said image data processing unit receives the image picked up by said fisheye lens.

8. The image display device of claim 6, wherein m and n are substantially equal.

9. The image display device of claim 6, wherein m and n both substantially equal 2.

10. The image display device of claim 6, wherein m and n both equal 2 such that the fisheye lens has a relationship of $h=2f\cdot\tan(\theta/2)$.

11. An information recording medium having recorded thereon a program including at least the steps of:

converting into a plane image an image obtained by a fisheye lens for picking up an image of all directions of a field of view around an optical axis of said fisheye lens at a field angle of at least 90° in each direction with respect to the optical axis, said fisheye lens having a relationship of $h=n\cdot f\cdot\tan(\theta/m)$, h being a height of an image of a subject at a predetermined point obtained by the fisheye lens, f being a focal distance of the fisheye lens, $\theta$ being a field angle, m having a value of $1.6 \leq m \leq 3$, and n having a value of $m-0.4 \leq n \leq m+0.4$;

displaying a predetermined portion of the converted plane image on a display unit; and changing continuously the predetermined portion with instruction means.

12. The information recording medium of claim 11, wherein m and n are substantially equal.

13. The information recording medium of claim 11, wherein m and n both substantially equal 2.

14. The information recording medium of claim 11, wherein m and n both equal 2 such that the fisheye lens has a relationship of $h=2f\cdot\tan(\theta/2)$.

* * * * *